Nov. 23, 1971   J. R. D'ENTREMONT ET AL   3,621,568
METHOD OF MAKING A MOTOR PROTECTOR
Original Filed April 12, 1968   2 Sheets-Sheet 1
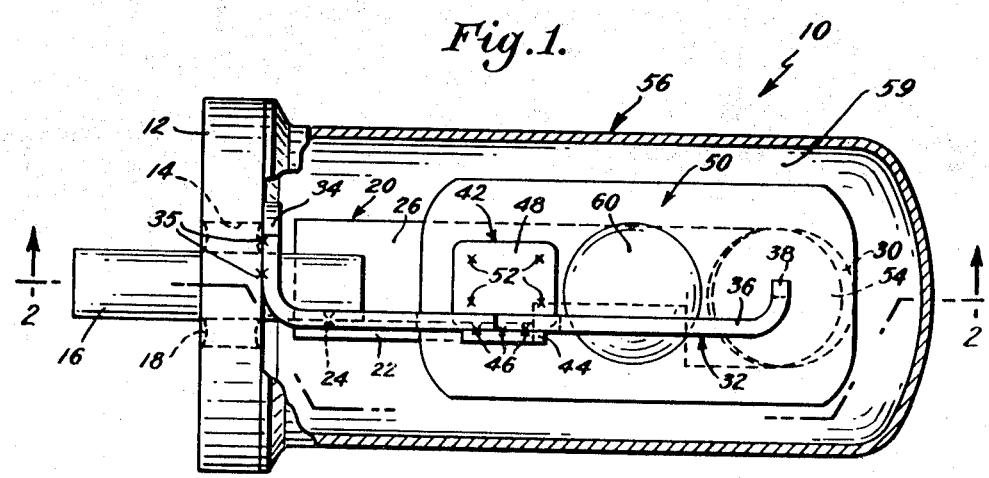
Fig. 1.
Fig. 2.
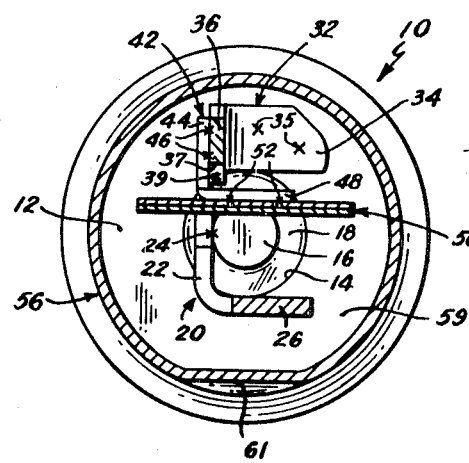
Fig. 3.
Inventors:
John R. D'Entremont,
Leith B. Young,
by James P. McAndrews
Att'y.

United States Patent Office 3,621,568
Patented Nov. 23, 1971

3,621,568
METHOD OF MAKING A MOTOR PROTECTOR
John R. D'Entremont, Foxboro, and Leith B. Young, Attleboro, Mass., assignors to Texas Instruments Incorporated, Dallas, Tex.
Original application Apr. 12, 1968, Ser. No. 720,980, now Patent No. 3,538,478, dated Nov. 3, 1970. Divided and this application Jan. 26, 1970, Ser. No. 10,703.
Int. Cl. H01h 11/00
U.S. Cl. 29—622   2 Claims

ABSTRACT OF THE DISCLOSURE

A hermetically-sealed, pressure-resistant motor protector is shown to comprise a header plate having a terminal post attached thereto in insulated relation to the plate, a cup-shaped body having its rim sealed to the header plate, a rigid angle-shaped heater element, a rigid angle-shaped contact arm having a fixed contact thereon, and a thermally-responsive snap-acting member having a movable contact at one end and having an angle-shaped support welded to the opposite end of the snap-acting member. These protector components are secured together by welding to provide a circuit from the header plate through the heater and snap-acting member with its movable contact to the fixed contact and from the fixed contact through the contact arm to the terminal post. The snap-acting member is adapted to move in response to heat generated by the heater element to open this circuit when an overload current occurs in the circuit. Each of the angle-shaped components has a first portion disposed in a selected plane and has an angularly disposed portion welded to an adjacent component. In this way, any collapse of the component materials which occurs during welding does not alter the disposition of the first portion of the respective component in its desired plane. This permits the components to be accurately assembled and secured together to provide an accurate motor protector. Preferably the angle-shaped support component has one flange welded to the thermally-responsive snap-acting member before the member is deformed to provide the member with its thermal response characteristics. Subsequent welding of the other flange of the support to an adjacent component permits accurate mounting of the snap-acting member in the motor protector without subjecting the snap-acting member to welding forces and temperatures which might alter its thermal response characteristics.

This is a division of our application Ser. No. 720,980, filed Apr. 12, 1968 and now Pat. No. 3,538,478.

Small sealed motor protector devices having snap-acting, thermally-responsive members are most economically manufactured by securing the device parts together by means of welding. However, the use of conventional welding techniques in manufacturing such devices frequently exposes the device components to excessive forces and temperatures which cause uncontrollable changes in the thermal response characteristics of the snap-acting device members. Further, even though device parts are initially located in the proper relationship to each other prior to welding, collapse of the part material in the areas being welded, and spring-back of the parts after completion of welding, tend to alter the part spacings so that the thermal response characteristics of the resulting devices are not uniform and so that many of the devices are not acceptable for their intended purpose.

It is an object of this invention to provide a novel and improved motor protector device; to provide such a motor protector which is hormetically sealed and pressure resistant; to provide such a motor protector which has accurately predetermined thermal response characteristics; and to provide such a motor protector which is of simple, rugged and economical construction. It is a further object of this invention to provide a novel and improved method for conveniently and accurately manufacturing such motor protector devices with uniform thermal response charactertistics.

Other objects, advantages and details of the motor protector devise and method of this invention appear in the following detailed description of preferred embodiments of this invention, the detailed description referring to the drawings in which:

FIG. 1 is a section view along the longitudinal axis of the motor protector device of this invention;

FIG. 2 is a section view along line 2—2 of FIG. 1;

FIG. 3 is a section view along line 3—3 of FIG. 2;

Figure 4:
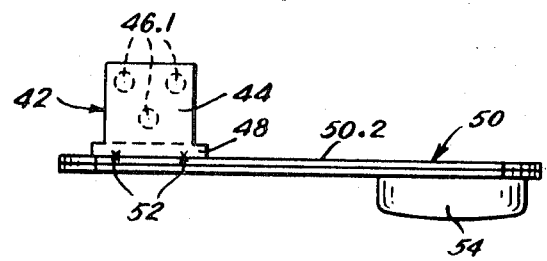
FIG. 4 is a side elevation view of components of the device of FIG. 1 illustrating a step in the manufacture of the device.

Referring to the drawings, 10 in FIGS. 1–3 indicates the novel and improved motor protector of this invention which is shown to include a generally disc-shaped header plate or member 12 having a central aperture 14 and having a terminal post 16 secured in the plate aperture in insulated relation to the plate by means of a sealant material 18. The header plate and terminal post are preferably formed of a rigid, electrically conductive material such as steel or the like. The rod is mounted in sealed, electrically insulated relation to the header plate by use of a glass sealant material 18 or other conventional electrically insulating material. As the terminal post is mounted in the header plate in the described manner by any well known technique, sealing of the terminal post and the header plate is not further described herein.

As shown, the motor protector 10 further includes a rigid electrically conductive contact arm 20 formed of steel or the like, the arm including one flange portion 22 which is welded to one side of the terminal post 16 as indicated at 24 in FIG. 2 and including an angularly disposed flange portion 26 which extends in cantilever relation from the post 16 in a plane generally parallel to the terminal post 16. A fixed contact 30, preferably formed of material of high electrical conductivity such as silver, is welded or otherwise secured to the distal end of the extending portion of the contact arm as shown.

The motor protector 10 further includes a heater element or member 32 having one flange portion 34 welded to the header plate 12 as indicated at 35 and having a second flange 36 extending in cantilever relation from the header plate so that an edge 37 of the extending flange faces the terminal post 16. The heater element preferably includes a stop or end portion 38 which terminates in a plane lying parallel to the axis of the terminal post 16. The heater element also preferably has a rounded surface 39 formed on the edge 37 of the flange 36 as shown in FIG. 2. The heater element is formed of any one of a variety of materials of selected electrical conductivity so that the element is adapted to generate a predetermined amount of heat in response to selected flow of electrical current through the element. For example, the heater element is preferably formed of rigid cold-rolled steel to provide the element with selected electrical heating characteristics. Alternately, heater elements of other rigid metals or the like are used for providing the heater with different electrical heating properties within the scope of this invention.

In addition, the motor protector 10 includes an electrically conductive, angle-shaped support 42 of cold-rolled steel or the like which has one flange 44 welded to the heater element flange 36 as indicated at 46 in FIG. 2 and another flange 48 welded to an electrically conductive, resilient, thermally-responsive snap-acting member 50 as indicated at 52 in FIG. 1. A movable contact 54, preferably formed of the same material as the fixed contact 30, is welded or otherwise secured to the thermally-responsive member oppositely of the support 42. As illustrated, the flange portion 44 of the support extends away from the thermally-responsive member at substantially a right angle to the general plane of the member. The welding of the support 42 to the heater 32 disposes the thermally-responsive member 50 in selected heat-transfer relation to the heater element and locates the member 50 extending in cantilever relation from the heater so that the movable contact 54 engages and disengages the fixed contact 30 in response to snap-acting movement of the member 50. That is, the member 50 is normally located as illustrated in solid lines in FIG. 2 so that the member resiliently holds the movable contact in engagement with the fixed contact to close a circuit from the header plate 12 through the heater 32, support 42, snap-acting member 50, contacts 54 and 30, and contact arm 20 to the terminal post 16. When this motor protector circuit is interposed in an electrical motor circuit, current flow through the heater element 32 of the motor protector does not normally generate sufficient heat to cause movement of the thermally-responsive member 50 so that the motor protector circuit remains closed. However, when abnormal current flows in the motor circuit, increased current flow through the heater element 32 generates sufficient heat to cause the snap-acting member 50 to move with snap-action to the position indicated by dotted lines 50.1 in FIG. 2 to disengage the contacts 54 and 30 and to open the described motor protector circuit. In this open circuit position, the snap-acting member 50 resiliently engages stop portion 38 of the heater element for limiting travel of the member away from the fixed contact and for preventing undesirable movement of the member in response to vibration and the like.

A cup-shaped body 56 formed of steel or other rigid material has its rim welded in electrically conductive relation to the header plate 16 as indicated at 58 to form a device chamber 59, this weld serving to seal the device chamber so that the motor protector 10 is completely sealed and pressure resistant. Preferably, the body has a flat portion 61 shown in FIG. 3 for use in locating the device 10 when mounting the device in a motor circuit.

In accordance with the method of this invention, the terminal post 16 is mounted in sealed insulated relation within the header plate aperture in conventional manner as shown. The heater element 32 is then located with the outer surface of the flange 34 engaged with the header plate, with the edge 37 of the heater facing toward the terminal post, and with the end of the stop portion 38 disposed in a plane properly spaced at the distance $a$ from the plane of the terminal post axis as indicated in FIG. 2. The heater element is then welded to the header plate as indicated at 35. Any collapse of the header plate or heater material occurring during formation of the weld at 35, and any spring back of the heater flanges after completion of the weld at 35, does not alter the spacing $a$ used in locating the end of the stop 38 in the proper plane. That is, the welding of the heater is easily accomplished to dispose the stop in the proper plane even though the relative angular disposition of the heater element flanges may be other than as desired.

Figure 5:
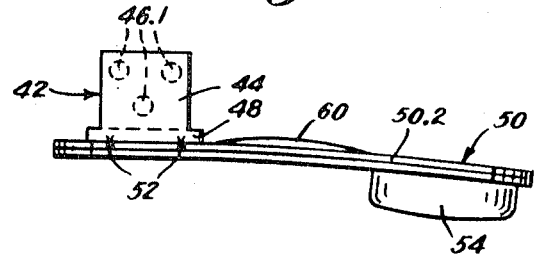
FIG. 5 is a side elevation view of device components similar to FIG. 4 illustrating a subsequent step in the method of this invention.

In accordance with the method of this invention, the thermally-responsive snap-acting element 50 is formed from a strip-shaped blank 50.2 of bimetallic material as illustrated in FIG. 4. That is, the strip 50.2 embodies two layers of metal bonded together, the metals being characterized by relatively high and low coefficients of thermal expansion respectively so that the strip tends to flex in response to temperature change. The movable device contact 54 is welded or otherwise secured to one end of the strip. In addition, one flange 48 of the support 42 is welded at 52 to the opposite end of the strip with the support flange 44 extending out of the general plane of the strip, this flange preferably having weld projections 46.1 thereon as shown in FIG. 4. After securing of the contact and support to the strip, the strip is deformed in conventional manner as shown in FIG. 5 to provide a dished-shaped portion 60 intermediate the support and contact, thereby to form a snap-acting member 50 of selected thermal response characteristics. As methods for deforming such bimetallic materials to form thermally-responsive snap-acting elements having precisely controlled thermal response characteristics are well known, the deformation of the strip 50.2 is not further described herein and it will be understood that the deformation is performed after welding of the support and contact to the strip within the scope of this invention.

Figure 6:
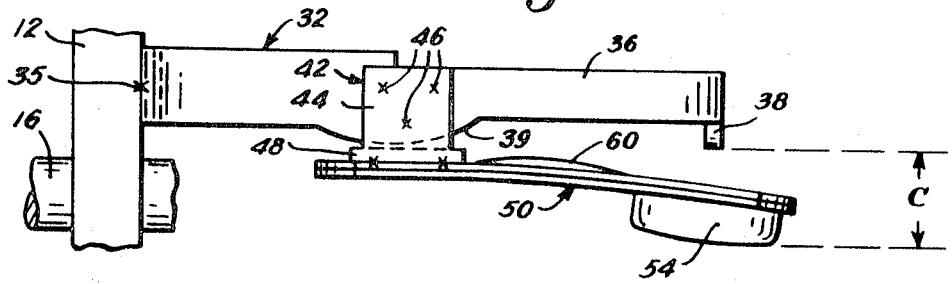
FIG. 6 is a side elevation view of device components similar to FIGS. 4 and 5 illustrating a further step in the method of this invention.

In the method of this inveniton, the snap-acting member 50 with its attached support and contact is located with the flange 44 of the support engaging the flange 36 of the heater element and with the movable contact 54 aligned with and located in a plane at a distance $c$ from the stop 38 of the heater element as shown in FIG. 6. In locating the fixed contact at the desired spacing from the heater stop, the support flange 44 is conveniently engaged with the rounded surface 39 of the heater element and is moved against this rounded surface to aid in locating the contact in the desired relation to the heater element stop. The support flange 44 and the flange 36 of the heater are then welded together at 46 as by gripping the support and heater flanges between the electrodes of a conventional resistance welding machine (not shown) or in other conventional manner. Note that, because the support flange 44 extends out of the general plane of the thermally-responsive member 50, no significant part of the heat normally generated during welding will be directed through the bimetallic member and the thermal responsive characteristics of the member will not be altered during the welding. In addition, although it will be understood that some collapsing of the heater and support material will tend to occur in the area where this weld is formed, this collapsing of the material does not alter the spacing $c$ between the plane of the heater element stop and the contact 54. Thus the use of the support 42 permits the bimetallic member and heater element to be accurately secured together while retaining the desired thermal response characteristics of the bimetallic member.

In the method of this invention, the fixed contact 30 is welded or otherwise secured to the contact arm 20 and the arm flange 22 is engaged with one side of the thermal post 16 so that the contact 30 is disposed in a plane at a selected distance $d$ from the stop 38 and in selected relationship to the movable contact 54. The engaging portions of the contact arm and terminal post are then welded together as indicated at 24 to maintain the fixed and movable contacts in the desired relationship. Again, any collapse of the contact arm or terminal post material in the area of the weld 24 does not alter location of the fixed contact in its desired plane. Further, even though the relative angular disposition of the contact arm flanges is other than as desired, the contact 50 is easily located in the desired plane. The cup-shaped body 56 is then welded to the header plate to complete assembly of the motor protector 10.

In this way, the motor protector is economically constructed to display precisely predetermined thermal response properties. The device is rugged and inexpensive, is hermetically sealed and pressure-resistant, is vibration-resistant so that the device does not tend to open or close a circuit inadvertently even when exposed to substantial vibrational forces, and is particularly suited for use in a freon atmosphere or the like to protect motors of various types.

It should be understood that although particular embodiments of the motor protector and method of this invention have been described by way of illustration, modifications of structure could be made within the scope of this invention. For example, the heater element and contact arm configurations could be interchanged, the heater then being welded to the terminal post and the contact arm being welded to the header plate. This invention includes all modifications and equivalents of the illustrated embodiments of the inventions which fall within the scope of the appended claims.

We claim:

1. A method for making a motor protector comprising the steps of providing an electrically-conductive header plate having a terminal mounted in scaled, electrically insulated relation to said plate, welding one flange of a rigid angle-shaped contact arm to said terminal so that said arm extends in cantilever relation therefrom, said arm having a fixed contact mounted at the distal end of said arm, welding one flange of a rigid angle-shaped heater element to said plate so that said heater element extends in cantilever relation from said plate in selected relation to said fixed contact, welding an electrically-conductive movable contact to one end of a strip-shaped bimetallic blank, welding one flange of an angle-shaped support to an opposite end of said blank so that another support flange extends out of the general plane of said blank, deforming said blank to provide a thermally-responsive snap-acting member having selected thermal response characteristics, and welding said extending flange of said support to said heater element to dispose said movable contact to engage and disengage said fixed contact in response to snap-acting movement of said thermally-responsive member.

2. The method as set forth in claim 1 wherein an open-ended cup-shaped rigid body is welded at its rim in sealed relation to said header plate for enclosing said heater element, contact arm and thermally-responsive member.

References Cited
UNITED STATES PATENTS

| | | | |
|---|---|---|---|
| 3,242,292 | 3/1966 | Malone | 337—112 X |
| 3,361,883 | 1/1968 | Brassard et al. | 29—622 X |
| 3,431,526 | 4/1969 | Ambler et al. | 337—89 |

JOHN F. CAMPBELL, Primary Examiner

C. E. HALL, Assistant Examiner

U.S. Cl. X.R.

317—13; 337—89, 112, 372